Feb. 28, 1939.  B. J. TAMARIN  2,148,590
HANDLE FOR VACUUM CLEANERS
Filed Aug. 6, 1936
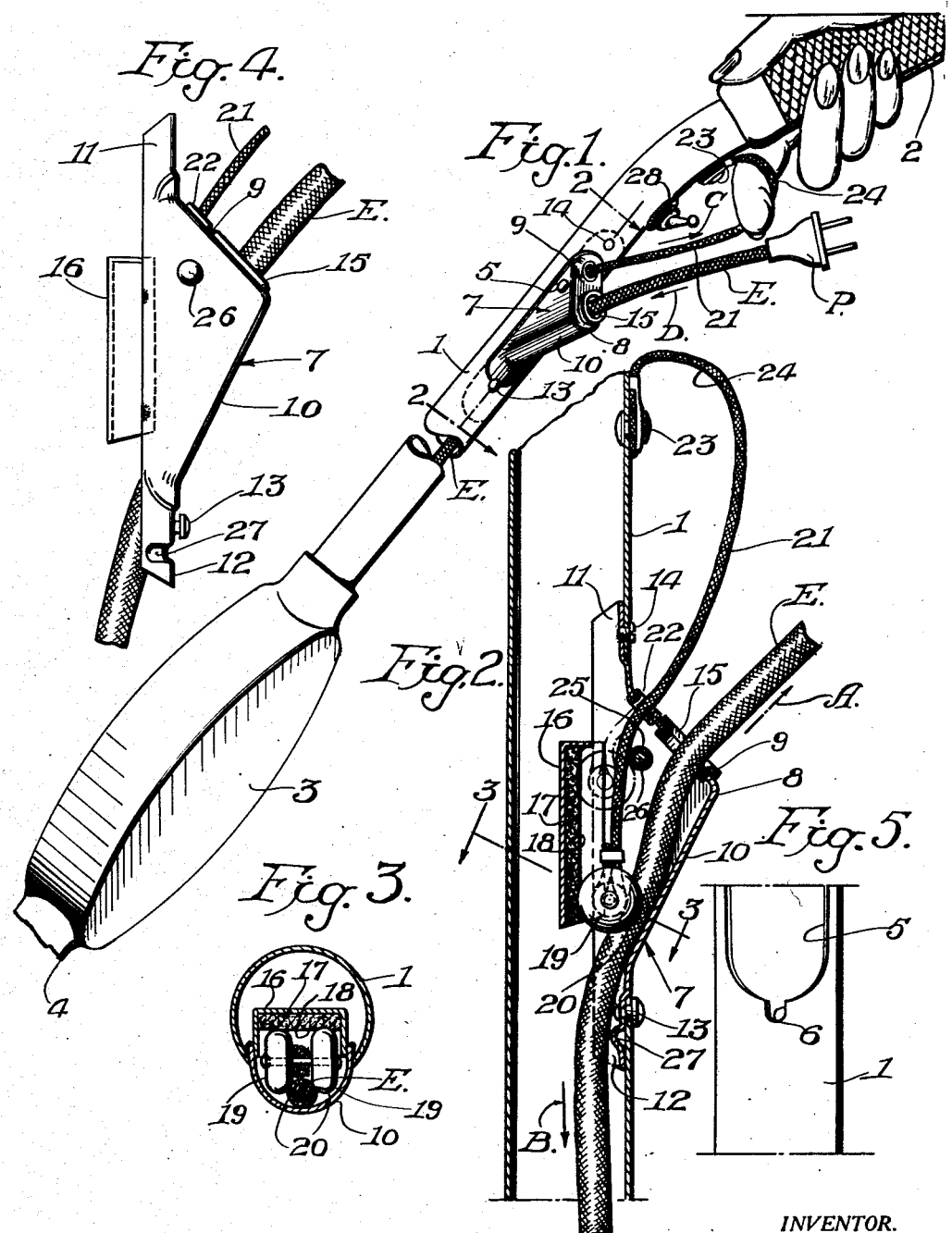
INVENTOR.
Bernard J. Tamarin
BY
William R. Smith
ATTORNEY.

Patented Feb. 28, 1939

2,148,590

UNITED STATES PATENT OFFICE 2,148,590

HANDLE FOR VACUUM CLEANERS

Bernard J. Tamarin, Philadelphia, Pa.

Application August 6, 1936, Serial No. 94,569

7 Claims. (Cl. 188—65.1)

The present invention relates to a handle especially adapted for use with vacuum cleaners. More particularly, the invention pertains to that type of vacuum cleaner handle having an automatically retractable electric cord which is wrapped around a spring operated drum within the handle.

The invention primarily aims to provide an improved braking device arranged upon a handle of the character mentioned for controlling the movement of the electric cord as it is retracted into the handle, by means of a spring operated drum, whereby the cord may be fixedly held at any point of its length to allow the required or desired portion of the cord let out of the handle to remain in drawn out position.

It is also an important object of the invention to provide a handle constructed to enclose an automatically retractable electric cord and including a combined cord outlet and braking device located in the vicinity of the hand grip of the handle whereby the braking device may be readily controlled from said hand grip to release the cord for its retraction within the handle.

Another meritorious feature of the invention resides in the provision of a handle of the type specified and including a braking element directly engageable with an electric cord retractable into the handle by means of an automatic reeling mechanism, said element being disposed for frictional engagement with the cord whereby a wedging action may be had therebetween, thus preventing the retraction of the cord by said automatic reeling mechanism.

Other important objects and advantages of the invention will be in part obvious and in part pointed out hereinafter.

In order that the invention and its mode of operation may be readily understood by those persons skilled in the art, I have, in the accompanying drawing, and in the detailed description based thereupon; set out a possible embodiment of the invention. In this drawing:

Figure 1 is a perspective of my improved handle showing the same in use.

Figure 2 is an enlarged longitudinal section taken on line 2—2 of Figure 1.

Figure 3 is a transversal section taken on line 3—3 of Figure 2.

Figure 4 is a side elevation of the combined cord outlet and braking device housing.

Figure 5 is a face elevation of a portion of the handle illustrating a detail of the formation of the opening adapted to receive the housing shown in Figure 4.

Having more particular reference to the drawing wherein like characters of reference will designate corresponding parts throughout, my improved device may be stated to comprise a main body section 1, which preferably consists of a length of hollow tubing through which passes an electric cord E having the usual connecting plug P. One end of the handle section 1 is provided with a hand grip 2, while the other end of said section 1 has securely attached thereto a casing 3 adapted to enclose any suitable well known automatic reeling mechanism (not shown), associated with the cord to retract the same and cause its disappearance into the handle.

The casing 3 rigidly carries an extension 4 at a point diametrically opposite to the point of connection of the casing with the handle body section 1, said extension serving as a means to connect the handle to a vacuum cleaner head of convenient type (not shown).

At the intermediate portion of the handle section 1, preferably in the vicinity of the hand grip 2, is cut an elongated opening 5 extending longitudinally of said section 1, and a slot 6 continuous with said opening 5 in the manner more clearly represented in Figure 5 of the drawing.

Adapted to be received within the opening 5 of the handle body section 1 is a housing 7 which, of preference, is stamped out of metal into substantially the shape illustrated in Figures 1, 2, and 4. As shown in these figures, the housing 7 is formed to have an angular protuberance 8 providing upper and lower tapering walls 9 and 10, each terminating into a flange 11 and 12 respectively. The flange 12, adapted to be inserted into the lower extremity of the opening 5 in the handle body section 1, is provided with a stud headed projection 13 devised for engagement within the slot 6 in said body section 1, whereas the flange 11, adapted for insertion into the upper extremity of the opening 5, is fixedly secured to the adjacent portion of the handle section 1 by means of a screw 14 or like fastening element. By so attaching the housing 7, it will be understood that the same is made rigid with the handle section 1 and positively held in position thereon.

The upper wall 9 of the housing 7 has an opening 15 providing an outlet through which passes the electric cord E.

Arranged upon that portion of the housing 7 to be received within the handle is a rigid plate 16 having a layer 17 of felting or like material forming a contacting surface 18 for a brake element shown as a dumb bell shaped roller 19 devised to partially straddle the electric cord E and thus engage opposite side portions thereof in the manner more fully shown at 20 in Figures 2 and 3 of the drawing. The roller 19 is preferably made of relatively heavy material so that it will normally fall by gravity into bearing engagement with adjacent portions of the surface 18 of the plate 16, and with the side portions 20 of the cord E. Because of this engagement of the roller with the surface 18 and the cord E it will be appreciated that the latter will be forced onto the tapering wall 10 of the housing 7 and wedged thereagainst, as will more clearly appear upon reference to Figure 2. It will also be appreciated that the wedging action on the cord E is created because of the particular association of the housing wall 10, the plate 16, and the roller 19 since, as will appear upon reference to Figure 2, the wall 10 converges towards the plate 16, thereby forming an angular pocket within which passes the cord E and in which is received the roller 19, the roller being positioned between the plate 16 and the cord E. Thus the roller 19, upon reaching the restricted end of the angular pocket, will lock the cord by wedging the same against the converging wall 10.

In order to release the roller 19 from its engagement with the cord E, there is provided a suitable manually operated control element which, in the form illustrated in the drawing, consists of the pull cord 21. One end of the cord 21 is secured to the roller 19 and the other end, passing through an opening 22 in the wall 9 of the housing 7, is affixed to the handle section 1, as shown at 23, forming a loop 24 in close proximity to the hand grip 2. A sheathed pin 25, positioned within the housing and mounted on a pin 26 riveted, or otherwise secured, to the opposite sides of the housing, serves as a guide for the cord 21 and also as a stop to limit the pull on the roller 19.

In order to prevent damage to the cord E as it is withdraw from or retracted into the handle, the lower flange 12 of the housing 7 may be formed with a boss 27 affording a riding surface for said cord. The handle is completed by the provision of a switch 28 disposed to be operated from the hand grip to control the current through the electric cord E.

In using my improved vacuum cleaner handle, the hand grip is held in one hand while the connection plug P is grasped with the other hand, and a sufficient length of the cord E is thereby withdrawn from the handle to allow said plug P to be connected to the household electric outlet from which the current is to be supplied to the vacuum cleaner.

The plug P having been connected to the household outlet and the switch 27 thrown in position to start the motor usually provided in the cleaner head (not shown), the machine is ready for operation. By holding the hand grip 2 in one hand, and momentarily grasping the cord E with the other hand while the handle is pushed forward, it will be understood that the exact amount of cord needed will be automatically withdrawn from the handle. If the hand that grasps the cord is repeatedly slid towards the handle as successive forward steps are taken, each time holding on to the cord E as the handle is pushed forward, the entire length of the cord may be withdrawn for use. Of course, if preferred, the cord may be withdrawn by hand as needed, rather than holding onto the cord and pushing the handle forward.

With particular reference to Figure 2, it will be understood that the cord E is manually withdrawn in the direction of the arrow A and automatically retracted by the reeling mechanism (not shown) in the direction of the arrow B. The automatic retraction of the cord E, however, will be effectively prevented by action of the braking roller 19 in the manner hereinbefore stated. In this connection, it is pointed out that the tendency of the cord E to move in the direction of the arrow B causes the roller 19 to more firmly wedge the cord and thus positively lock the same, since, due to the frictional engagement of the roller 19 with the cord, the former will be forced to move in the same direction as the latter until both the roller and cord become tightly wedged between the plate 16 and the tapering walls 10 of the housing 7 and further movement is impossible.

From the foregoing, it will be understood that in moving the handle away from the electric outlet connection, the cord control loop 24 does not have to be touched because, for the same reason that roller 19 will move the cord in the direction of arrow B, so will the roller move with the cord in the direction of arrow A, accordingly destroying the wedging action aforesaid and permitting free withdrawal of the cord. However, when it is desired to move the handle back towards the connecting outlet, a finger of the same hand holding the hand grip 2 may engage the loop 24 and by pulling said loop trigger fashion, as represented by the arrow C in Figure 1, the roller 19 is released from its engagement with the cord E, allowing the latter to be freely reeled in and causing the unneeded length of cord to be retracted out of the way by disappearing into the handle, as indicated by the arrow D in Figure 1.

At this point, attention is called to the fact that the connection plug P on the end of the cord E being considerably larger than the outlet opening 15, the plug will be prevented from entering the handle body 1.

In view of the foregoing, it will be appreciated that I have provided a handle construction that includes a simple, yet effective, control mechanism for the automatically retractable electric cord thereof, and whereas the structure shown and described exemplifies the preferred form of the invention, it will be understood that the structure is capable of several modifications. Accordingly, those modifications coming within the scope of the subjoined claims are to be considered within the spirit of the invention.

What I claim is:

1. In a handle of the character described, the combination with a cord withdrawable from and retractable into said handle, of a braking device for said cord comprising a housing provided with a wall and a rigid plate between which passes the cord, said wall converging towards the plate to form an angular pocket having a restricted portion, and a dumb-bell shaped roller positioned between the plate and the cord, said roller frictionally bearing against the plate and partially straddling the cord to frictionally engage opposed side portions thereof, whereby said roller, upon reaching the restricted portion of said pocket, will act to wedge the cord against said wall thus preventing the cord from being retracted.

2. In a handle of the character described, the combination with a cord withdrawable from and retractable into said handle, of a braking device for said cord comprising a housing provided with a wall and a rigid plate between which passes the cord, said wall converging towards the plate to form an angular pocket having a restricted portion, a dumb-bell shaped roller positioned between the plate and the cord, said roller frictionally bearing against the plate and partially straddling the cord to frictionally engage opposed side portions thereof, whereby said roller, upon reaching the restricted portion of said pocket, will act to wedge the cord against said wall thus preventing the cord from being retracted, and a pull cord attached to said roller and adapted to exert a pull thereon for releasing the same from its wedging action.

3. In a handle of the character described, the combination with a cord withdrawable from and retractable into said handle, of a braking device for said cord comprising, a housing provided with a wall and a rigid plate between which said cord passes, a roller freely received between the plate and the cord for frictional engagement therewith, said wall and plate being associated to cause the roller to become wedged therebetween for snug engagement with the cord to normally prevent the latter from being retracted, and to allow the roller to be released for disengaging the cord to permit its retraction, a pull cord attached to said roller and adapted to exert a pull thereon for releasing the same, and means mounted in the housing for guiding the pull cord and limiting the pull on said roller.

4. In a handle of the character described, the combination with a cord withdrawable from and retractable into said handle, of a braking device for said cord comprising, a housing provided with a wall and a rigid plate between which passes the cord, said wall converging towards the plate to form an angular pocket having a restricted portion, a dumb-bell shaped roller positioned between the plate and the cord, said roller frictionally bearing against the plate and partially straddling the cord to frictionally engage opposed side portions thereof, whereby said roller, upon reaching the restricted portion of said pocket, will act to wedge the cord against said wall, thus preventing the cord from being retracted, and means attached to said roller and adapted to exert a pull thereon for extracting the same out of the restricted portion of said pocket, thereby releasing the roller from its wedging action to allow the cord to be retracted.

5. A braking device for a withdrawable, retractable cord comprising: a housing having a pair of diametrically opposed surfaces between which said cord passes, one of said surfaces converging towards the other to form an angular pocket having a restricted portion, and an element freely received between one of said surfaces and the cord for frictional engagement therewith whereby said element, upon reaching the restricted portion of said pocket, will act to wedge the cord against the other of said surfaces, thus preventing said cord from being retracted; pulling means connected to said element and adapted to exert a pull thereon for extracting the same out of the restricted portion of said pocket, thereby releasing the element from its wedging action to allow the cord to be retracted, and means mounted in the housing for guiding said pulling means in its movement and limiting the pull on said roller.

6. A braking device for a withdrawable, retractable cord comprising: a housing provided with a wall and a rigid plate between which said cord passes; a roller freely received between the plate and the cord for frictional engagement therewith, said wall and plate being associated to cause the roller to become wedged therebetween for snug engagement with the cord to normally prevent the latter from being retracted, and to allow the roller to be released for disengaging the cord to permit its retraction, a pull cord attached to said roller and adapted to exert a pull thereon for releasing the same, and means mounted in the housing for guiding the pull cord and limiting the pull on said roller.

7. A braking device for a withdrawable, retractable cord comprising: a housing provided with a wall and a rigid plate between which the cord passes, said wall converging towards the plate to form an angular pocket having a restricted portion, a dumb-bell shaped roller positioned between the plate and the cord, said roller frictionally bearing against the plate and partially straddling the cord to frictionally engage opposed side portions thereof, whereby said roller, upon reaching the restricted portion of said pocket, will act to wedge the cord against said wall, thus preventing the cord from being retracted, and a pull cord attached to said roller and adapted to exert a pull thereon for releasing the same from its wedging action.

BERNARD J. TAMARIN.